US011032371B2

(12) United States Patent
Becker

(10) Patent No.: US 11,032,371 B2
(45) Date of Patent: Jun. 8, 2021

(54) DATA MIGRATION USING READ FUNCTION TRIGGERS

(71) Applicant: Red Hat, Inc., Raleigh, NC (US)

(72) Inventor: Nimrod Becker, Giv'atayim (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/425,755

(22) Filed: May 29, 2019

(65) Prior Publication Data

US 2020/0382591 A1 Dec. 3, 2020

(51) Int. Cl.

*G06F 15/16* (2006.01)
*H04L 29/08* (2006.01)
*H04L 12/26* (2006.01)
*G06F 16/21* (2019.01)

(52) U.S. Cl.

CPC ........ *H04L 67/1097* (2013.01); *G06F 16/214* (2019.01); *H04L 43/16* (2013.01)

(58) Field of Classification Search

CPC .... H04L 67/1097; H04L 43/16; G06F 16/214
See application file for complete search history.

(56) References Cited

U.S. PATENT DOCUMENTS 9,430,400 B2 8/2016 Duluk, Jr.
9,569,742 B2 2/2017 Puttaswamy Naga et al.
9,648,134 B2 5/2017 Frank
2005/0138308 A1* 6/2005 Morishita ............. G06F 3/0647 711/162
2011/0060916 A1* 3/2011 Faitelson ................ G06F 16/13 713/189
2012/0222041 A1* 8/2012 Sabin .................. H04L 67/1008 718/105
2013/0036284 A1* 2/2013 Ansari ................ G06F 12/0207 711/165
2013/0179635 A1* 7/2013 Zhang ................... G06F 3/0685 711/114
2013/0339407 A1* 12/2013 Sharpe ................ G06F 16/1752 707/827

(Continued)

FOREIGN PATENT DOCUMENTS

CN 104270336 B 10/2018

OTHER PUBLICATIONS

"Serverless database computing—Azure Functions and Azure Cosmos DB," SNGUN, SnehaGunda, GitHub, Inc, Mar. 26, 2018, 4 pages. Retrieved from: https://github.com/MicrosoftDocs/azure-docs/blob/master/articles/cosmos-db/serverless-computing-database.md.

(Continued)

*Primary Examiner* — Richard G Keehn
(74) *Attorney, Agent, or Firm* — Womble Bond Dickinson (US) LLP

(57) ABSTRACT

Reads of data stored at a first location of a cloud storage system by an application are monitored. A determination as to whether to migrate the data stored at the first location of the cloud storage system to a second location of the cloud storage system in view of the monitoring of the reads of the data by the application is made. In response to determining that the data stored at the first location is to be migrated, a function trigger is added to the data, wherein the function trigger causes the data to be migrated from the first location of the cloud storage system to the second location of the cloud system upon a subsequent read of the data by the application.

20 Claims, 10 Drawing Sheets

450
APPLICATION 405
BUCKET 410
FIRST LOCATION 415
DATA 425a
MIGRATE DATA
SECOND LOCATION 420
DATA 425b

(56) References Cited

U.S. PATENT DOCUMENTS

| | | | | |
|---|---|---|---|---|
| 2014/0006465 | A1* | 1/2014 | Davis | G06F 16/183 707/827 |
| 2014/0007239 | A1* | 1/2014 | Sharpe | G06F 16/137 726/24 |
| 2018/0232174 | A1 | 8/2018 | Zhou et al. | |
| 2020/0071648 | A1* | 3/2020 | Moore | A61B 5/04001 |

OTHER PUBLICATIONS

"How AWS Database Migration Service Works," 2019, Amazon Web Services, Inc., 3 pages. Retrieved from: https://docs.aws.amazon.com/dms/latest/userguide/CHAP_Introduction.html.

Roee Zilkha, "Database Migration at Scale," Oct. 9, 2018, 21 pages. Retrieved from: https://medium.com/callapp/database-migration-at-scale-ae85c14c3621.

* cited by examiner

DATA MIGRATION USING READ FUNCTION TRIGGERS

TECHNICAL FIELD

Aspects of the present disclosure relate to a cloud-based storage system.

BACKGROUND

Cloud computing provides computer system resources, such as data storage, without direct active management by a user. Public cloud storage allows multiple users to store data at data centers or servers via a network connection. Clouds often have functions that are distributed over multiple locations from central servers.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
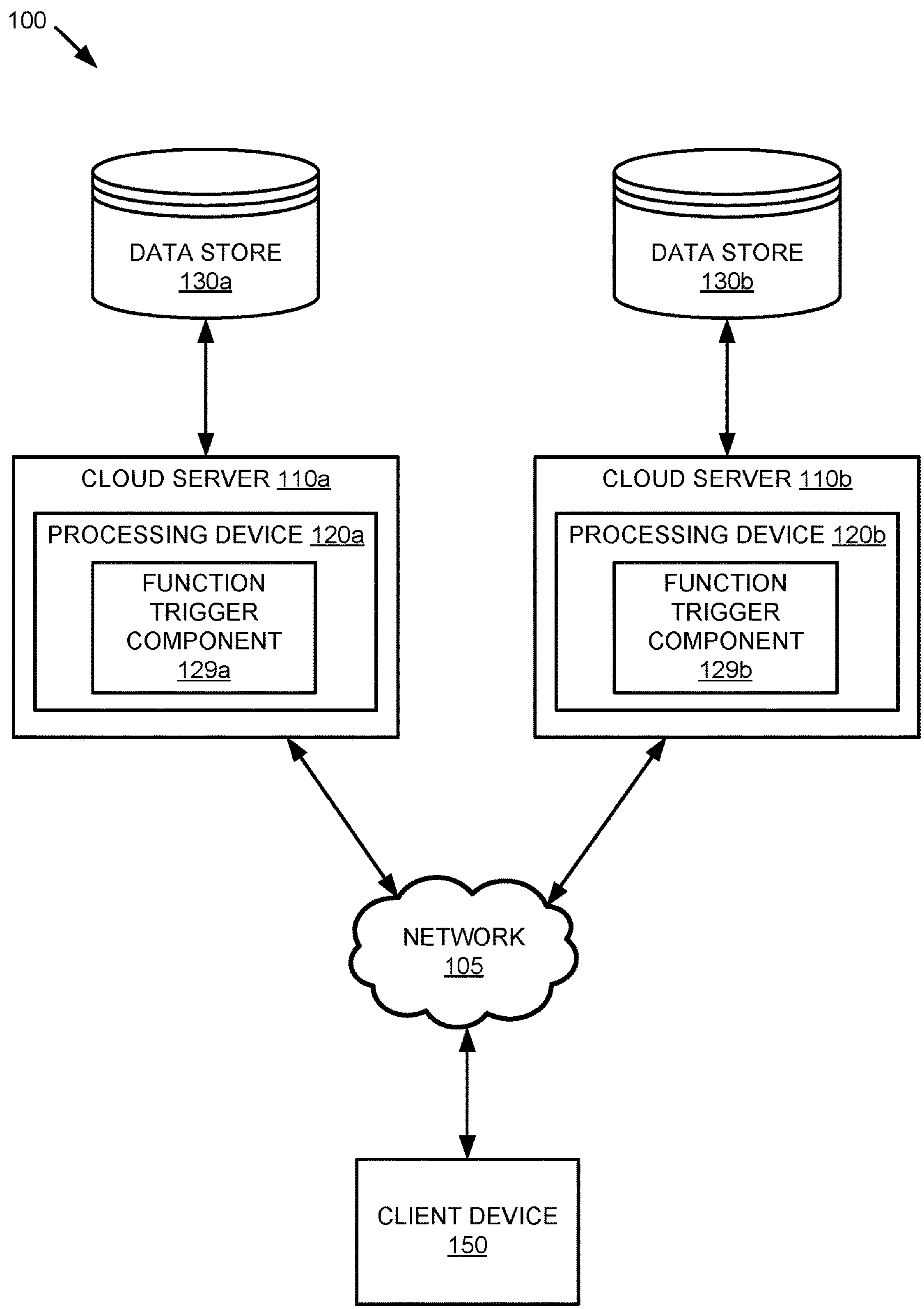
FIG. 1 is a block diagram that illustrates an example application development system, in accordance with some embodiments of the present disclosure.

Aspects of the present disclosure are directed towards data migration using function triggers. A cloud-based storage system (also referred to as "cloud storage system" hereafter) may include multiple cloud servers distributed across multiple locations that are operatively coupled to one another via a network. Users may store data at the cloud-based storage system via client devices of the user that are operatively coupled to the cloud-based storage system via the network. Applications executed by the client device may read/modify/erase data stored at the cloud storage system via a bucket. The bucket may be a logical container for the storage of data being accessed by the application. The bucket may be mapped to a physical data store of the cloud storage system.

Cloud storage systems have costs associated with data stored at the cloud storage system. For example, reading an amount of data from the cloud storage system by an application, transferring an amount of data from one location to another location of the cloud storage system, storing an amount of data at the cloud storage system, etc. may all have associated monetary costs for performing such actions. Typically, the monetary costs associated with reading/storing data at cloud storage systems are significantly less than the monetary costs associated with transferring (also referred to as "migrating" hereafter) the data.

In a conventional cloud storage system, an application may read/modify/transfer data stored at the cloud storage system while being unaware of the costs associated with these actions. For example, an application may provide a command to transfer all data associated with the application from a first location of the cloud storage system to a second location of the cloud storage system without knowing the costs associated with the transfer. This may result in a user of the application accruing a large monetary cost from the transferring of the data. Additionally, much of the data being transferred may not be accessed by the application very frequently or at all. This results in monetary costs being accrued for transferring data to a new location that may never/infrequently be accessed by the application.

Aspects of the present disclosure address the above-noted and other deficiencies by using a processing logic of a cloud storage system to migrate data stored at a cloud storage system using a read function trigger. In embodiments, the processing logic may receive a command from an application accessing data stored at the cloud storage system to migrate the data from a first location of the cloud storage system to a second location of the cloud storage system. In some embodiments, the processing logic may identify the second location of the cloud storage system to migrate the data to upon determining that the second location will reduce costs and/or improve the performance of the application.

The processing logic may monitor reads of the data stored at the cloud storage system by the application. For example, the processing logic may monitor all read requests for the data received by the cloud storage system from the application. The processing logic determines whether to migrate the data from the first location of the cloud storage system to the second location of the cloud storage system in view of monitoring the reads. For example, if a number of times the data is read by the application satisfies a threshold, then the processing logic may determine to migrate the data from the first location to the second location.

In some embodiments, the processing logic may determine whether the monetary costs (also referred to as "costs" hereafter) associated with migrating the data satisfies a cost threshold. For example, a user may specify that they do not want the costs associated with migrating data to exceed $200. If the processing logic determines that the costs satisfy a cost threshold, the processing logic may determine to not migrate the data from the first location to the second location.

Upon determining to migrate the data from the first location to the second location, the processing logic adds a read function trigger (also referred to as "function trigger" hereafter) to the data. The read function trigger causes the data to be migrated from the first location to the second location when a read request for the data is received from the application. When a read request is received from the application, the read function trigger is invoked and the data is migrated from the first location to the second location of the cloud storage system.

Accordingly, by migrating data stored at a cloud storage system using a read function trigger, data that is read by the application is migrated to a new location while data that is not used by the application is not migrated to the new location, reducing monetary costs associated with transferring the data and improving the performance of the cloud storage system.

FIG. 1 is a block diagram that illustrates an example cloud storage system 100, in accordance with some embodiments of the present disclosure. The cloud storage system 100 may include cloud servers 110*a, b* and client device 150.

As illustrated in FIG. 1, cloud storage system 100 includes cloud servers 110*a, b* that include computing processing devices 120*a, b* and data stores 130*a, b*, respectively. The cloud servers 110*a, b* and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g. cell towers), etc. The network 105 may carry communications (e.g., data, message, packets, frames, etc.) between the various components of cloud servers 110*a, b.*

The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The cloud servers 110*a, b* and client device 150 may include any suitable type of computing device or machine that has a programmable processor including, for example, server computers, desktop computers, laptop computers, tablet computers, smartphones, set-top boxes, etc. In some examples, cloud servers 110*a, b* and client device 150 may comprise a single machine or may include multiple interconnected machines (e.g., multiple servers configured in a cluster). Cloud servers 110*a, b* and client device 150 may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In embodiments, processing devices 120*a, b* may execute function trigger components 129*a, b*, respectively. The function trigger components 129*a, b* may monitor reads of data stored at cloud storage system 100 by an application. The function trigger components 129*a, b* may determine whether to migrate the data from a first location of the cloud storage system 100 to a second location of the cloud storage system 100. In response to determining to migrate the data, the function trigger components 129*a, b* add a read function trigger to the data. Further details regarding function trigger components 129*a, b* will be discussed at FIGS. 2-8 below.

Figure 2:
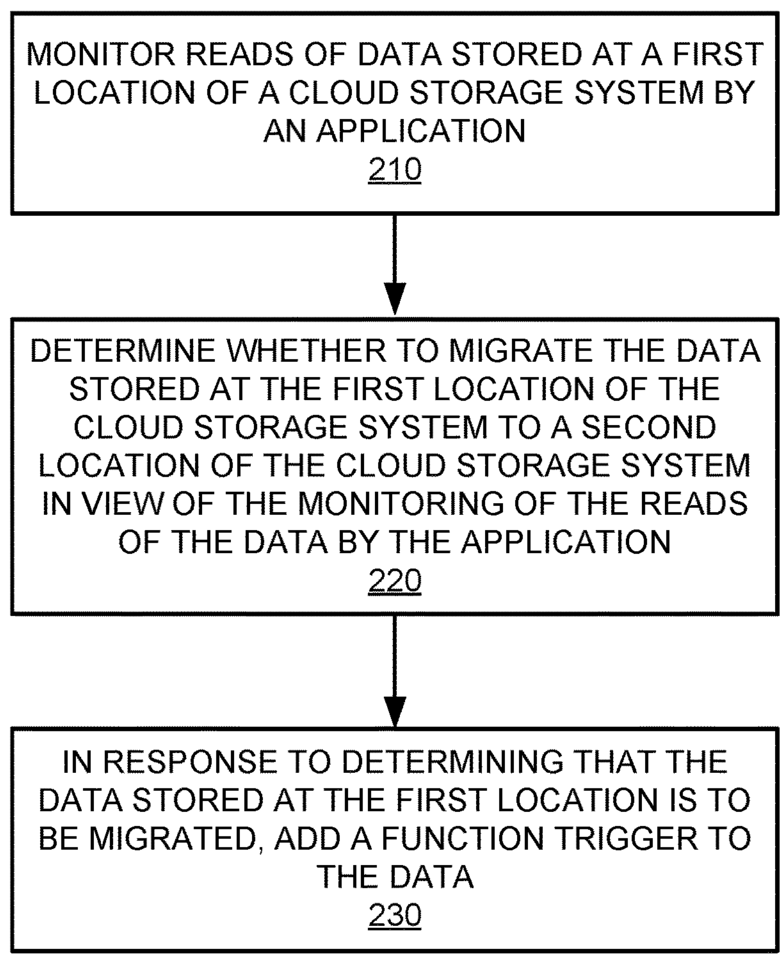
FIG. 2 is a flow diagram of a method of adding a function trigger to data associated with an application, in accordance with some embodiments of the present disclosure.

FIG. 2 is a flow diagram of a method 200 of adding a function trigger to data associated with an application, in accordance with some embodiments of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 200 may be performed by function trigger component 129*a* and/or 129*b* of FIG. 1.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 may be performed.

Referring to FIG. 2, at block 210 the processing logic monitors reads of data stored at a first location of a cloud storage system by an application. The processing logic may maintain a data structure that logs read requests from an application to read data stored at the first location of the cloud storage system. For example, the processing logic may identify read requests received from the application for data stored at the first location. The processing logic may then update the data structure to include the identified read requests.

At block 220, the processing logic determines whether to migrate the data stored at the first location of the cloud storage system to a second location of the cloud storage system in view of the monitoring of the reads of the data by the application. In some embodiments, the processing logic may determine whether to migrate the data in view of a number of reads of the data by the application satisfying a read threshold. In embodiments, the processing logic may determine whether to migrate the data in view of costs associated with migrating the data satisfying a cost threshold. In an embodiment, the processing logic may utilize other heuristics associated with the data and/or application to determine whether to migrate the data.

In response to determining that the data stored at the first location is to be migrated, at block 230 the processing logic adds a function trigger to the data. The function trigger, when invoked, may cause the data to be relocated from the first location of the cloud storage system to the second location of the cloud storage system. The function trigger may be invoked when a subsequent read request is received for the data from the application. Upon receiving the read request from the application, the processing logic may migrate the data to the second location of the cloud storage system. The processing logic may migrate the data to the second location by transmitting a copy of the data to the second location of the cloud storage system for storage.

Figure 3:
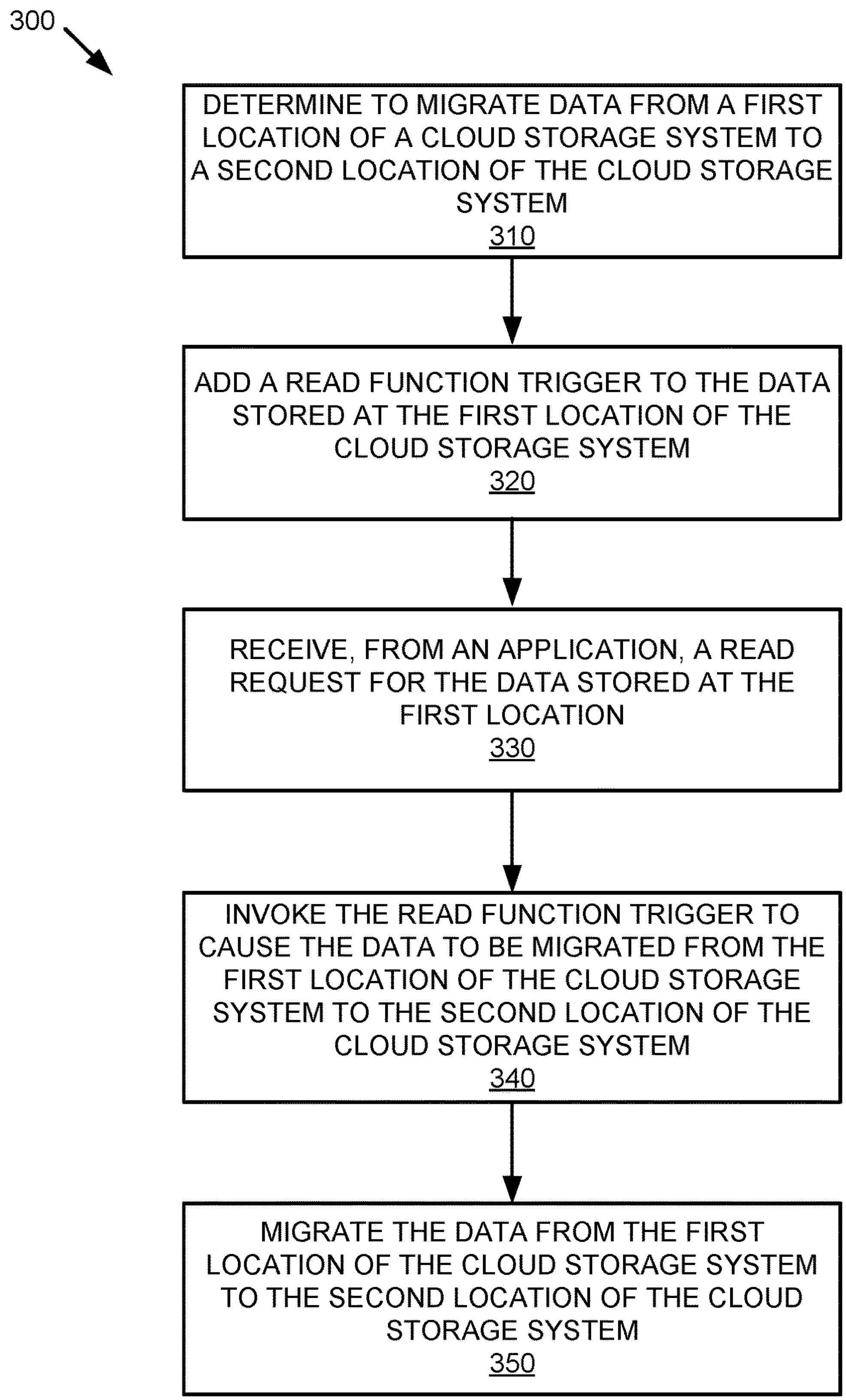
FIG. 3 is a flow diagram of a method of migrating data using a read function trigger, in accordance with some embodiments of the present disclosure.

FIG. 3 is a flow diagram of a method 300 of migrating data using a read function trigger, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 300 may be performed by function trigger component 129*a* and/or 129*b* of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Referring to FIG. 3, at block 310 the processing logic determines to migrate data from a first location of a cloud storage system to a second location of the cloud storage system. In some embodiments, the processing logic may determine to migrate the data from the first location to the second location in view of receiving a command from an application associated with the data. For example, the processing logic may receive a command from the application indicating that data used by the application is to be migrated from the first location to the second location. In embodiments, the processing logic may determine to migrate the data from the first location to the second location in view reducing costs of reading the data and/or improving performance of the application, as will be described in further detail below.

At block 320, the processing logic adds a read function trigger to the data stored at the first location of the cloud storage system. As previously described, the read function trigger, when invoked, causes the data stored at the first location of the cloud storage system to be migrated to the second location of the cloud storage system.

At block 330, the processing logic receives, from an application, a read request for the data stored at the first location.

Upon receiving the read request for the data, at block 340, the processing logic invokes the read function trigger to cause the data to be migrated from the first location of the cloud storage system to the second location of the cloud storage system. At block 350, the processing logic migrates the data from the first location of the cloud storage system to the second location of the cloud storage system.

Figure 4A:
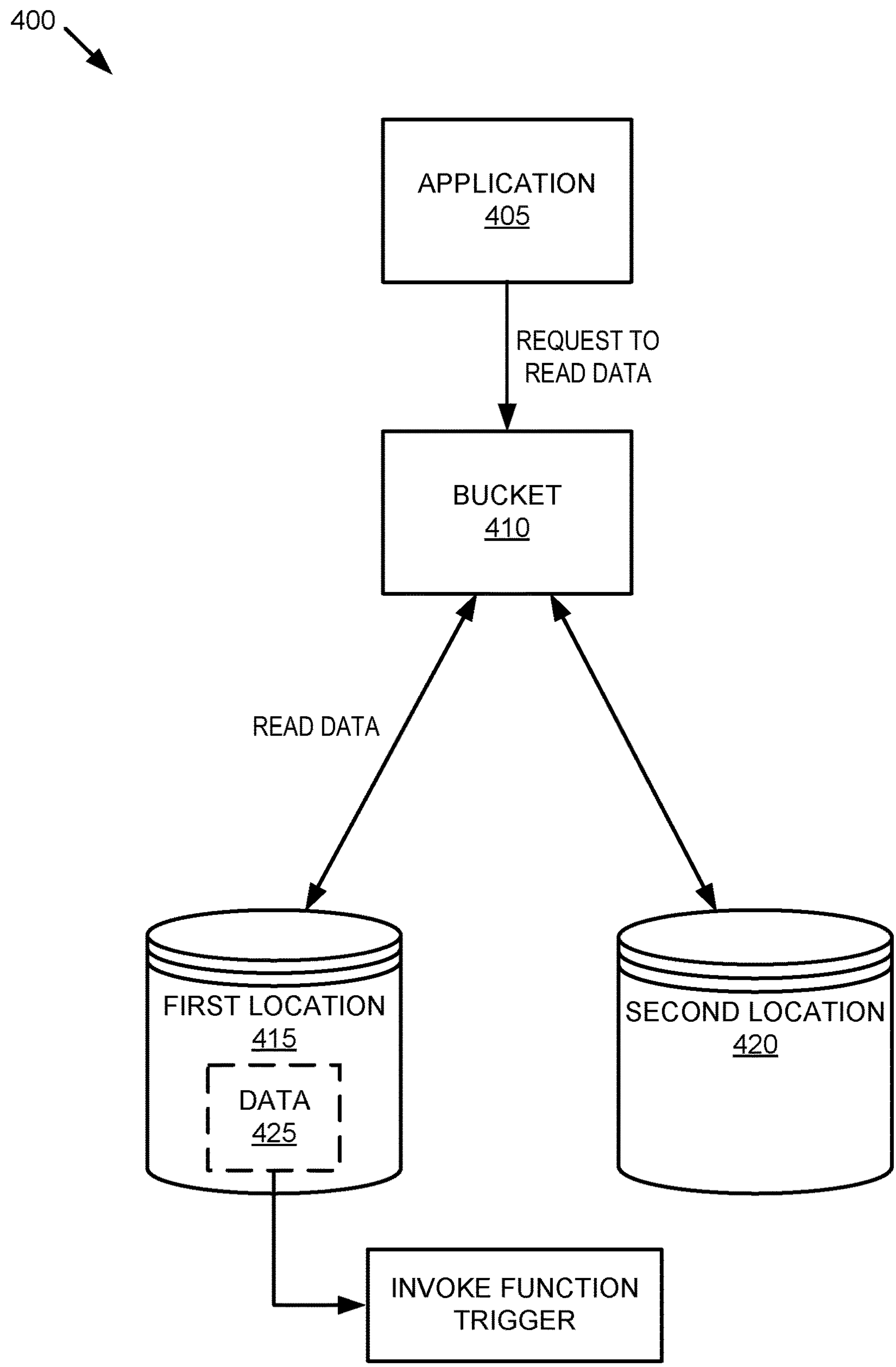
FIG. 4A is an illustration of an example of a cloud storage system environment invoking a function trigger in accordance with aspects of the present disclosure.

FIG. 4A is an illustration of an example of a cloud storage system environment 400 invoking a function trigger in accordance with aspects of the present disclosure. The cloud storage system environment 400 may include an application 405 executed by a client device (not shown). It should be noted that application 405 is shown for illustrative purposes only and is not a physical component of the cloud storage system environment 400. The application 405 may read data stored at the cloud storage system via a bucket 410. The bucket 410 may be a logical container for storing data that is mapped to a physical location (e.g., first location 415 and/or second location 420) of a data store of the cloud storage system.

The cloud storage system environment 400 also includes a first location 415 of the cloud storage system and a second location 420 of the cloud storage system. In embodiments, first location 415 may correspond to data store 130*a* of FIG. 1 and second location 420 may correspond to data store 130*b* of FIG. 1. For clarity, cloud servers 110*a, b* are not shown. In some embodiments, first location 415 and second location 420 may be located at the same data store (e.g., one of data store 130*a* or 130*b*). Data 425 may correspond to data that is associated with the application 405 that is stored at the first location 415 of the cloud storage system. A function trigger has been added to data 425, as previously described.

The application 405 may request to read data (e.g., data 425) via bucket 410. Bucket 410 may be mapped to the physical location of data 425 at first location 415. When the read request is received at the first location 415 via bucket 410, the function trigger previously added to data 425 is invoked to cause the migration of data 425 from the first location 415 to the second location 420. In embodiments, prior to the migration of data 425, data 425 may be read from first location 415 and transmitted to application 405 via bucket 410.

Figure 4B:
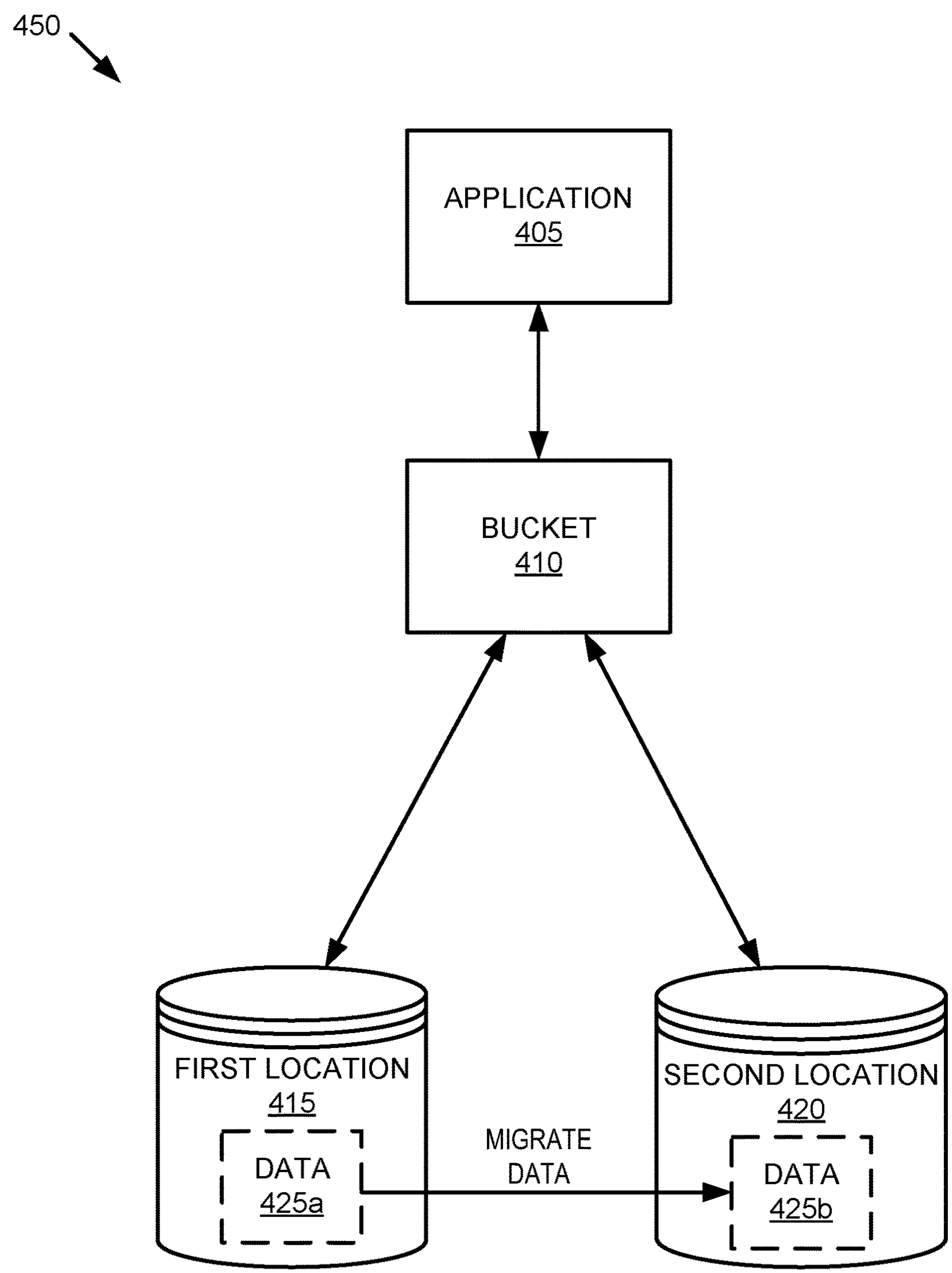
FIG. 4B is an illustration of an example of a cloud storage system environment migrating data from a first location of a cloud storage system to a second location of the cloud storage system in accordance with aspects of the present disclosure.

FIG. 4B is an illustration of an example of a cloud storage system environment 450 migrating data from a first location of a cloud storage system to a second location of the cloud storage system in accordance with aspects of the present disclosure.

Upon invoking the function trigger at FIG. 4A, data 425*a* stored at the first location 415 of the cloud storage system may be migrated to the second location 420 of the cloud storage system. The migration process may include a copy of data 425*a* (e.g., data 425*b*) stored at the first location 415 being transmitted to the second location 420 of the storage system. Upon receipt of data 425*b* at the second location 420, a processing device (not shown) associated with the second location 420 may program the data 425*b* to the second location 420. Upon programming the data, the processing device at the second location 420 may transmit an indication to the first location 415 that indicates the data 425*b* was successfully programmed at the second location 420 and the migration of data 425*a, b* is complete. The data 425*a* may be subsequently erased at the first location 415 and the logical address for data 425*a, b* may be updated at bucket 410 to correspond to the second location 420 storing data 425*b*.

Figure 5:
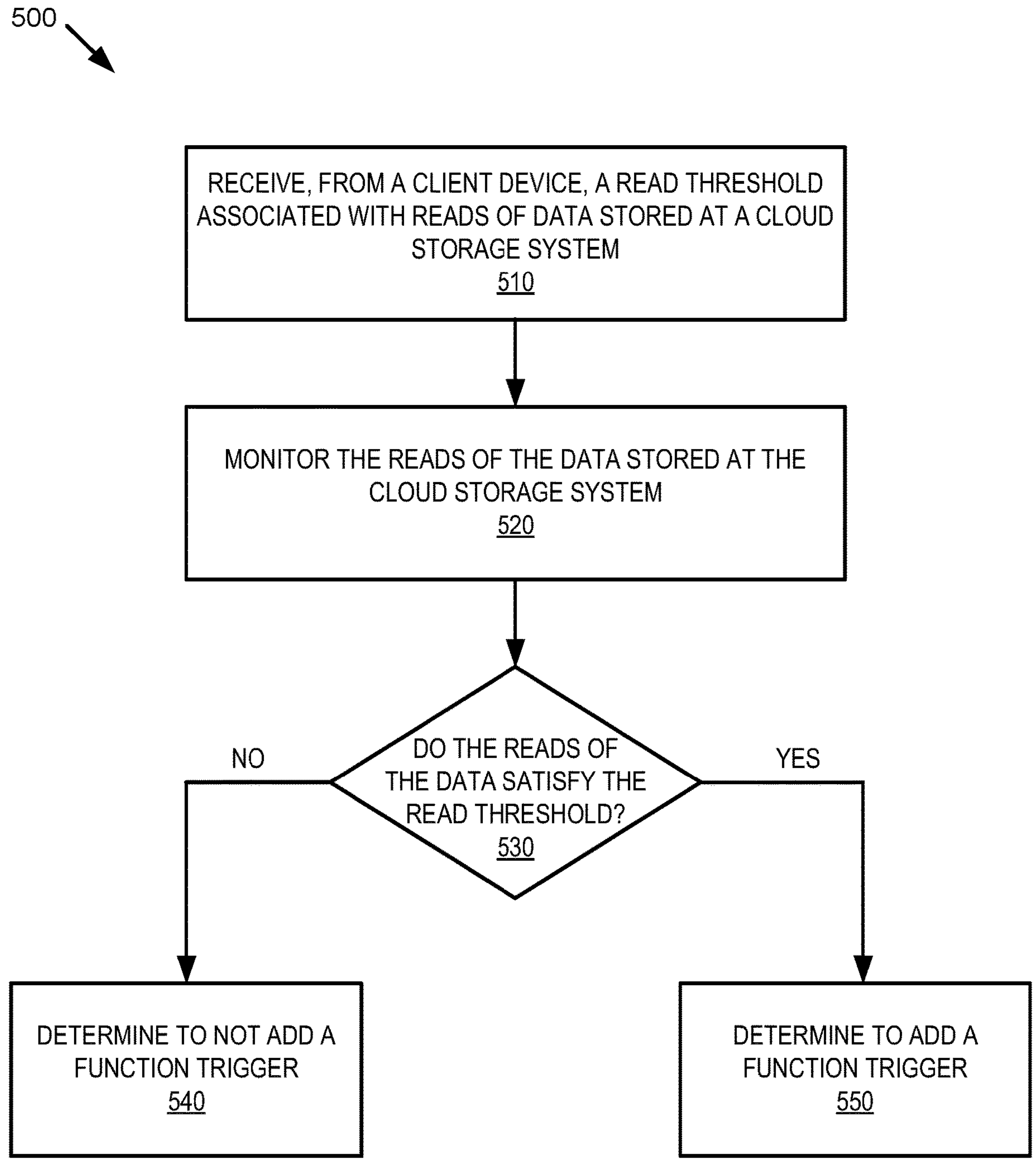
FIG. 5 is a flow diagram of a method of determining whether a number of reads of data satisfies a read threshold, in accordance with some embodiments of the present disclosure.

FIG. 5 is a flow diagram of a method 500 of determining whether a number of reads of data satisfies a read threshold, in accordance with some embodiments of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 500 may be performed by function trigger component 129*a* and/or 129*b* of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Referring to FIG. 5, at block 510 the processing logic receives, from a client device, a read threshold associated with reads of data stored at a cloud storage system. In embodiments, a user may desire that multiple read requests be received for a particular piece of data before adding a function trigger to migrate the data. For example, the user may desire that 4 read requests for a particular piece of data be received before adding a function trigger to the particular piece of data. Accordingly, the user may transmit, via a client device, a read threshold corresponding to a number of read requests received for the particular piece of data (e.g., 4) that occur prior to adding a function trigger to the piece of data. In some embodiments, the read threshold may correspond to a number of read requests received for a particular piece of data per unit of time. For example, the read threshold may correspond to a number of read requests per hour that are received for a particular piece of data.

At block 520, the processing logic monitors the reads of the data stored at the cloud storage system, as previously described.

At block 530, the processing logic determines if the number of reads of the data stored at the cloud storage system satisfy the read threshold. In some embodiments, the number of reads of the data satisfies the read threshold if the number of reads is greater than or equal to the read threshold. In other embodiments, the number of reads of the data satisfies the read threshold if the number of reads is less than or equal to the read threshold.

If the number of reads of the data does not satisfy the read threshold, at block 540 the processing logic determines to not add a function trigger to the data.

If the number of reads of the data does satisfy the read threshold, at block 550 the processing logic determines to add a function trigger to the data, as previously described.

Figure 6:
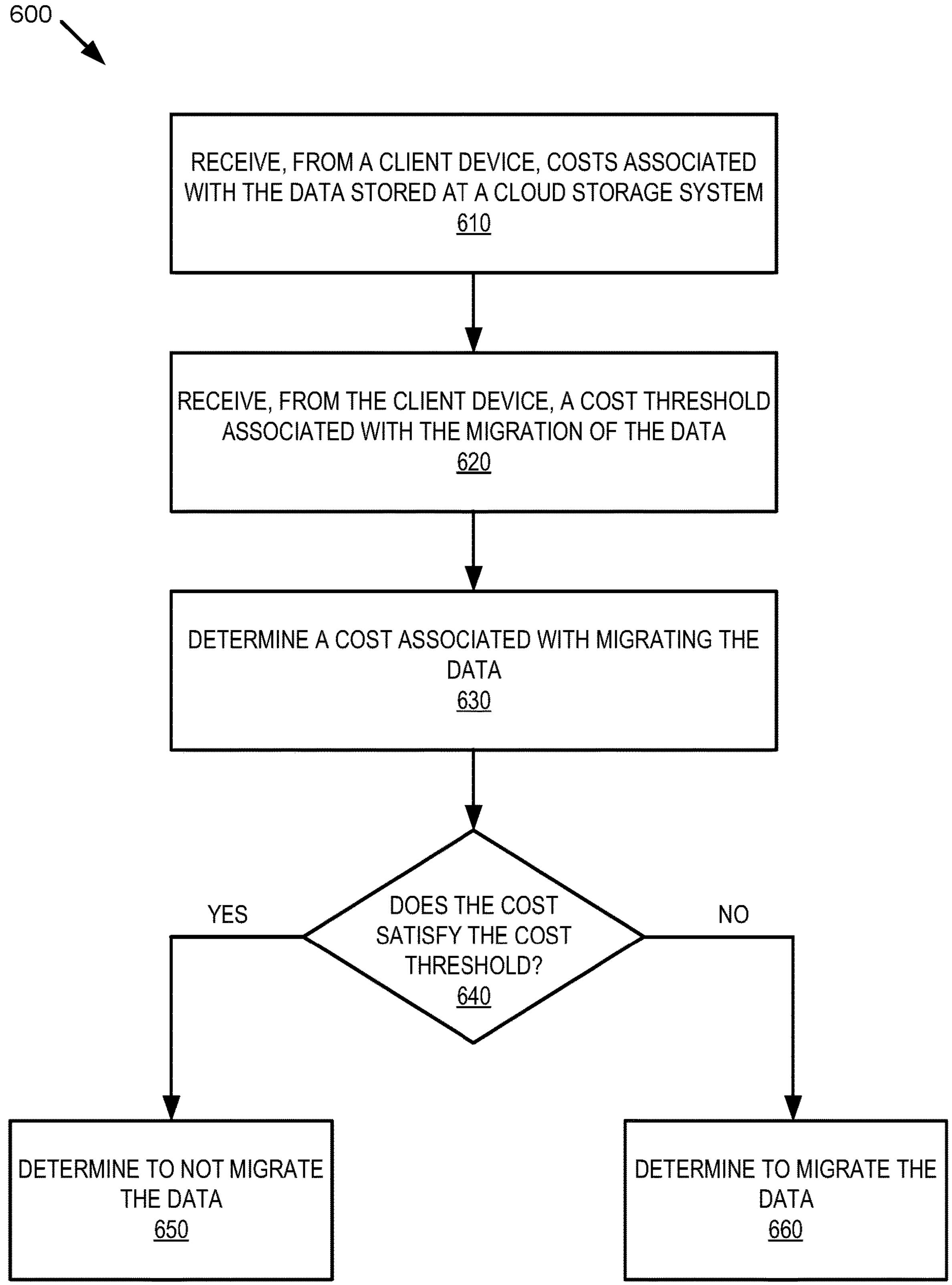
FIG. 6 is a flow diagram of a method of determining whether a cost associated with migrating data from a first location to a second location of a cloud storage system satisfies a cost threshold, in accordance with some embodiments of the present disclosure.

FIG. 6 is a flow diagram of a method 600 of determining whether a cost associated with migrating data from a first location to a second location of a cloud storage system satisfies a cost threshold, in accordance with some embodiments of the present disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 600 may be performed by function trigger component 129*a* and/or 129*b* of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Referring to FIG. 6, at block 610 the processing logic receives, from a client device, costs associated with the data stored at a cloud storage system. As previously discussed, there may be costs associated with reading data from a cloud storage system, storing data at the cloud storage system and migrating data from a first location to a second location of the cloud storage system. For example, it may cost $1 per gigabyte (GB) of data to read data from the cloud storage system, $1 per GB to write data to the cloud storage system and $5 per GB to migrate the data from the first location to the second location of the cloud storage system. In some embodiments, the processing logic may receive the costs form the client device via a user interface, such as a graphical user interface (GUI), including one or more fields to facilitate the input of costs associated with the data.

At block 620, the processing logic receives, from the client device, a cost threshold associated with the migration of the data. As previously described, a user may desire to limit the costs associated with data stored at the cloud storage system. For example, a user may desire that the costs for the data (e.g., costs associated with reading the data, migrating the data, etc.) stored at the cloud storage system do not exceed $200. Accordingly, the user may provide, via a client device, a cost threshold of $200 associated with the migration of the data. In some embodiments, the cost threshold may correspond to a cost per migration of data. For example, a user may desire to limit the costs for each data migration be less than $5. Accordingly, the user may provide a cost threshold of $5 per migration of data.

At block 630, the processing logic determines a cost associated with migrating the data from the first location to the second location of the cloud storage system. In embodiments, the processing logic may determine the cost in view of the costs associated with the data received at block 610 and the size of the data to be migrated. For example, if the cost to migrate the data from the first location to the second location is $5 per GB of data and there is 2 GB of data to be migrated, then the processing logic determines that the cost associated with migrating the data is $10.

At block 640, the processing logic determines if the cost determined at block 630 satisfies the cost threshold received at block 620. In embodiments, the cost satisfies the cost threshold if the cost is greater than or equal to the cost threshold. In other embodiments, the cost satisfies the cost threshold if the cost is less than or equal to the cost threshold. In some embodiments, the cost associated with migrating the data satisfies the cost threshold if the cost associated with migrating the data causes the total costs associated with the data stored at the cloud storage system to satisfy the cost threshold. For example, if the cost threshold is $200 and $195 in costs associated with the data have been accrued, if the cost to migrate the data from the first location to the second location is $5 or more, than the cost satisfies the cost threshold. In an embodiment, the cost associated with migrating the data satisfies the cost threshold if the cost determined at block 630 satisfies a cost threshold corresponding to a cost per migration of the data. For example, if the cost threshold corresponds to $5 per migration of data, then the cost of migrating the data satisfies the cost threshold if the determined cost at block 630 is $5 or more.

If the processing logic determines that the cost satisfies the cost threshold, at block 650 the processing logic determines to not migrate the data. In embodiments, upon determining to not migrate the data, the processing logic may generate and transmit a notification to the client device of the user. The notification may indicate that the costs associated with migrating the data satisfied the cost threshold and that migration of the data was not performed.

If the processing logic determines that the cost does not satisfy the cost threshold, at block 660 the processing logic determines to migrate the data from the first location of the cloud storage system to the second location of the cloud storage system, as previously described.

Figure 7:
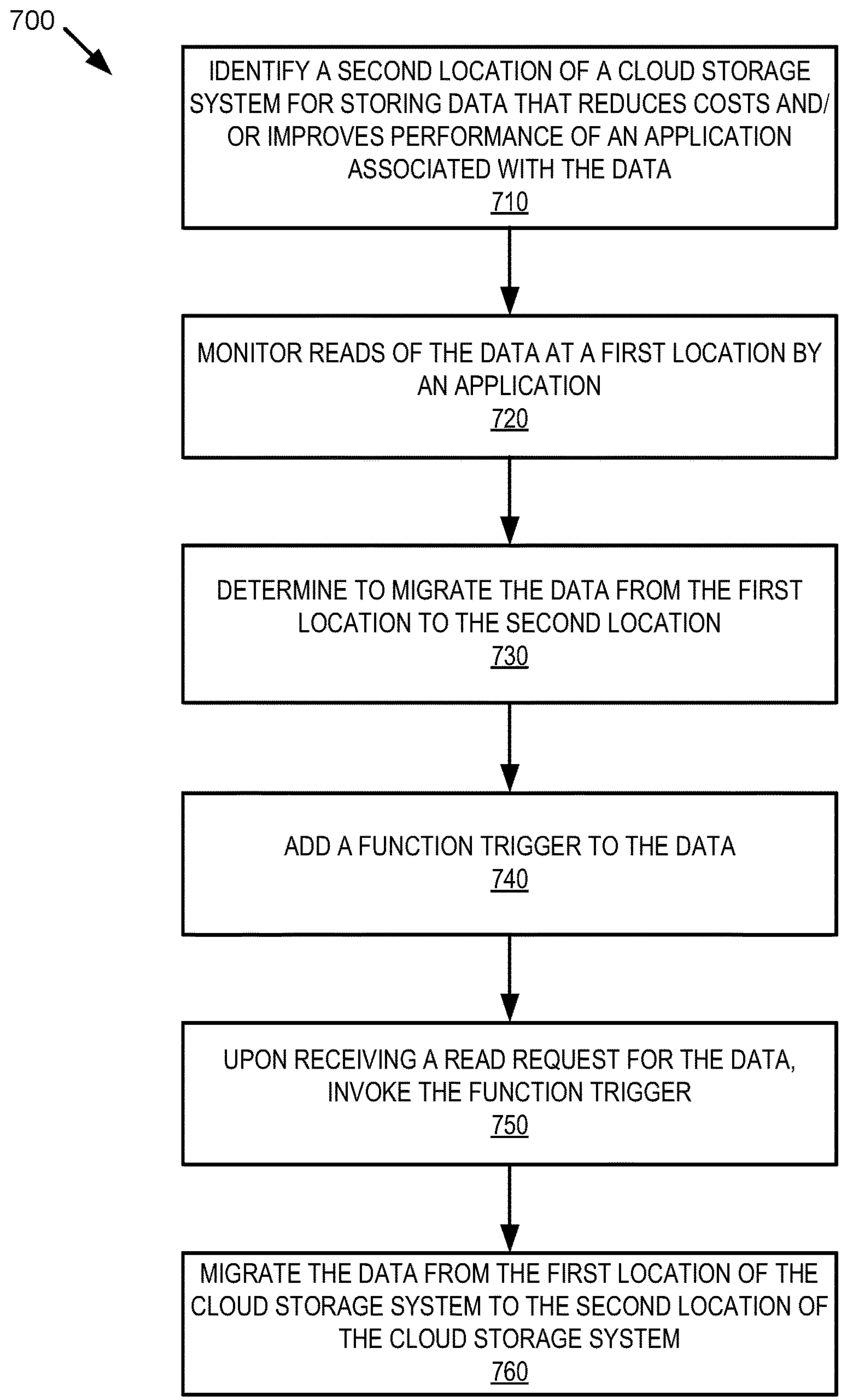
FIG. 7 is a flow diagram of a method of adding a function trigger to migrate data in view of reducing costs or improving performance, in accordance with some embodiments of the present disclosure.

FIG. 7 is a flow diagram of a method 700 of adding a function trigger to migrate data in view of reducing costs or improving performance, in accordance with some embodiments of the present disclosure. The method 700 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 700 may be performed by function trigger component 129*a* and/or 129*b* of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Referring to FIG. 7, at block 710 the processing logic identifies a second location of a cloud storage system for the storage of data that is stored at a first location of the cloud storage system. In embodiments, the processing logic may identify a second location that reduces the costs associated with the data stored at the cloud storage system. For example, the processing logic may identify a second location that costs less per read of data, amount of data stored at the second location, etc. In some embodiments, the processing logic may identify a second location that improves the performance of the application reading the data. For example, the processing logic may identify a second location that is closer in proximity to the application accessing the data, reducing latency and improving performance of the application.

At block 720, the processing logic monitors reads of the data stored at the first location of the cloud storage system by the application.

At block 730, the processing logic determines to migrate the data from the first location of the cloud storage system to the second location of the cloud storage system, as previously described.

At block 740, the processing logic adds a function trigger to the data that, when invoked, causes the data to be migrated from the first location to the second location of the cloud storage system.

Upon receiving a read request for the data, at block 750 the processing logic invokes the function trigger added to the data at block 750.

At block 760, the processing logic migrates the data from the first location of the cloud storage system to the second location of the cloud storage system, as previously described.

Figure 8:
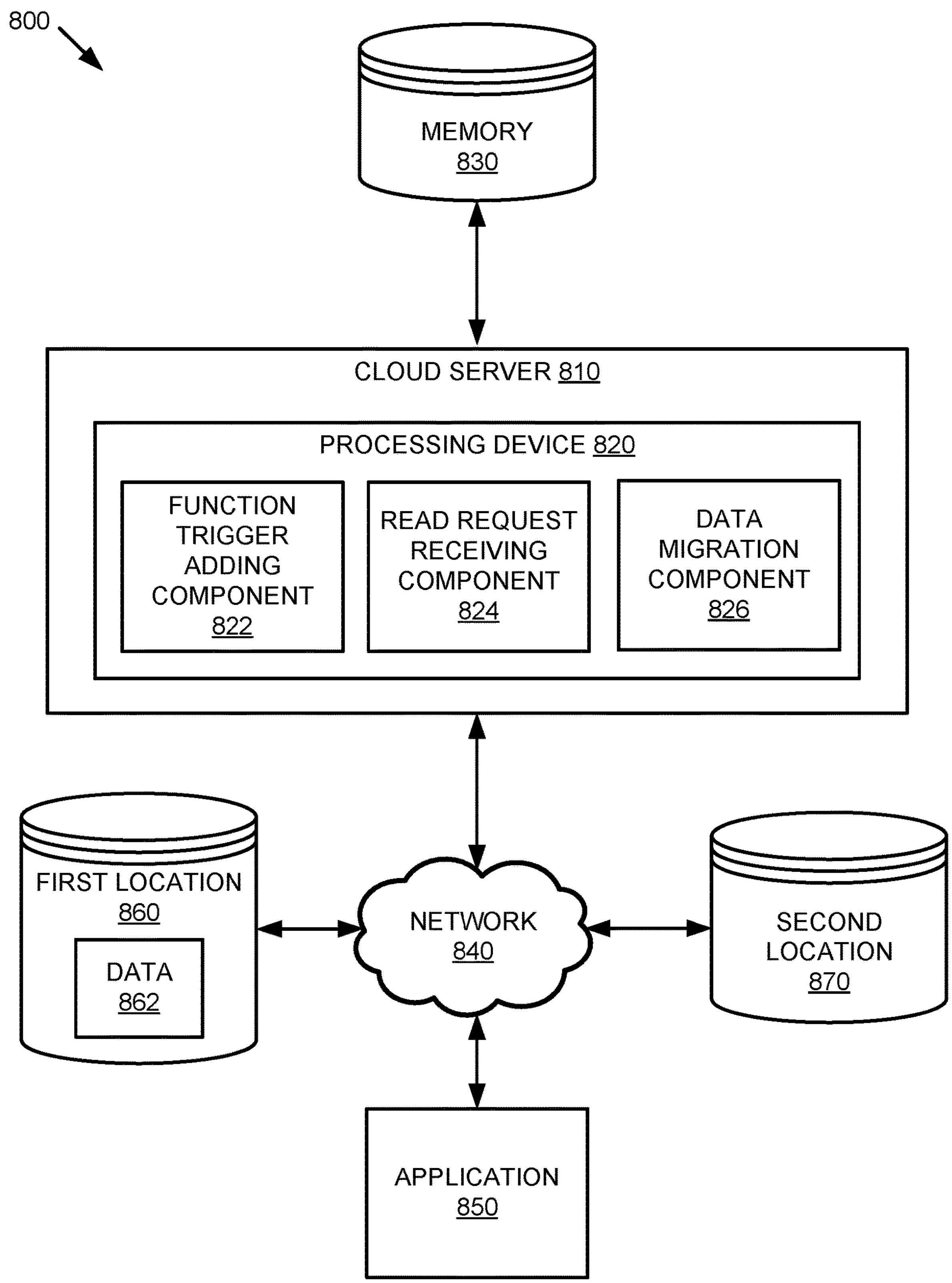
FIG. 8 is a block diagram that illustrates an example of a cloud storage system in accordance with some aspects of the disclosure.

FIG. 8 is a block diagram that illustrates an example of a cloud storage system 800 in accordance with some aspects of the disclosure. A processing device 820 of the cloud server 810 is operatively coupled to a memory 830. The processing device 820 may include a function trigger adding component 822, a read request receiving component 824, and a data migration component 826. The cloud server 810 may be operatively coupled to a client device executing an application 850, a first location 860 of the cloud storage system 800 and a second location 870 of the cloud storage system 800 via a network 840. The first location 860 may store data 862 that includes a read function trigger.

The function trigger adding component 822 may add a function trigger to data 862 stored at the first location 860. The read request receiving component 824 may receive read requests for data 862 from application 850. The read request receiving component 824 may further invoke the read function trigger added to data 862 by the function trigger adding component 822. The data migration component 826 may cause the migration of data 862 from the first location 860 of cloud storage system 800 to the second location 870 of the cloud storage system 800.

Figure 9:
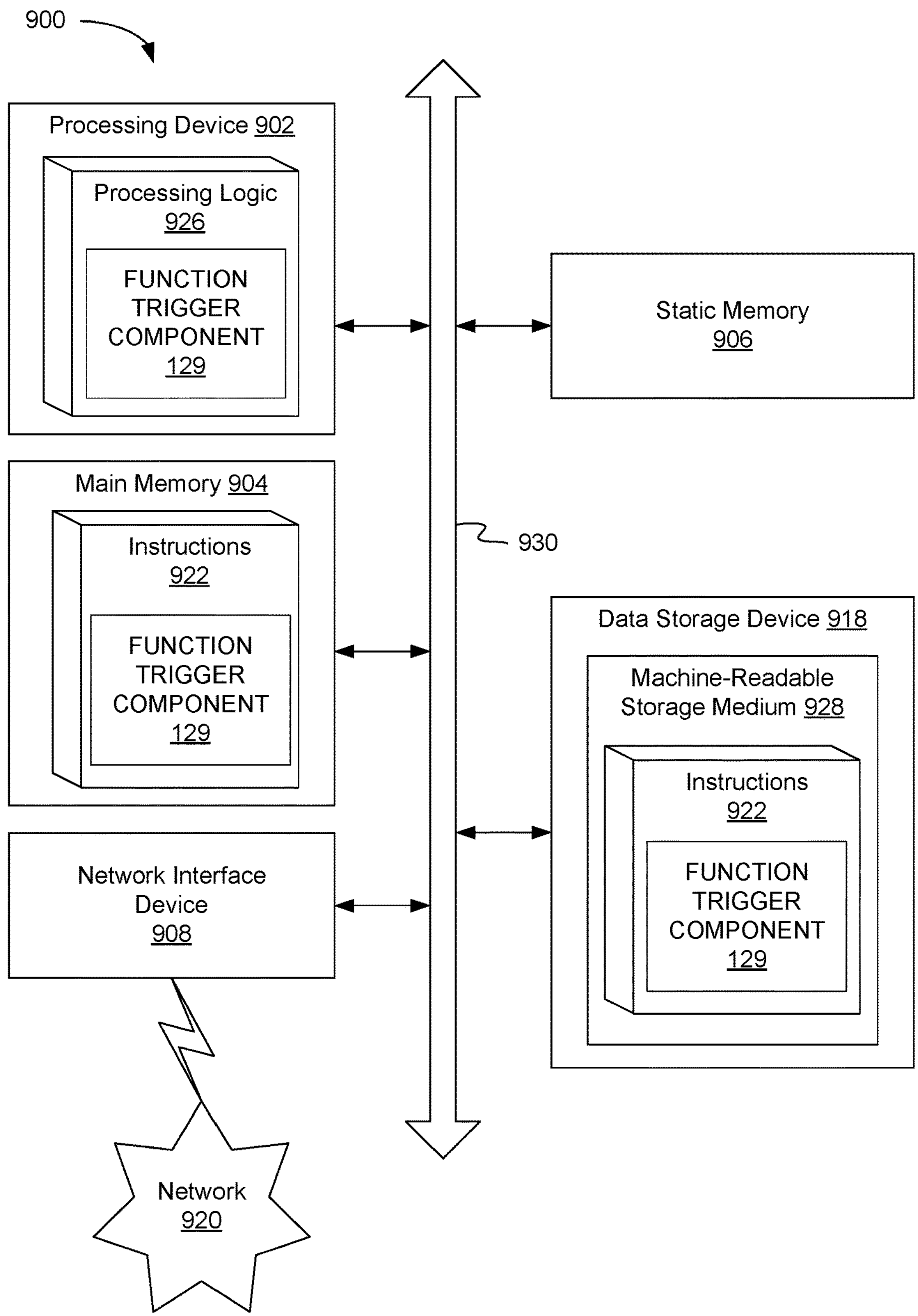
FIG. 9 is a block diagram of an example apparatus that may perform one or more of the operations described herein, in accordance with some embodiments.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a server, such as cloud servers 110*a, b* configured to perform data storage and migration.

The exemplary computer system 900 includes a processing device 902, a main memory 904 (e.g., read-only memory (ROM), flash memory, dynamic random access memory (DRAM), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926, which may be one example of function trigger components 129*a, b* of FIG. 1, for performing the operations and steps discussed herein.

The data storage device 918 may include a machine-readable storage medium 928, on which is stored one or more set of instructions 922 (e.g., software) embodying any one or more of the methodologies of functions described herein, including instructions to cause the processing device 902 to execute function trigger component 129 (e.g., function trigger component 129*a* or 129*b* of FIG. 1). The instructions 922 may also reside, completely or at least partially, within the main memory 904 or within the processing device 902 during execution thereof by the computer system 900; the main memory 904 and the processing device 902 also constituting machine-readable storage media. The instructions 922 may further be transmitted or received over a network 920 via the network interface device 908.

The machine-readable storage medium 928 may also be used to store instructions to perform a method for multi-level task debugging, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:

monitoring reads of data stored at a first location of a bucket of a cloud storage system that is accessed by an application;

determining, by a processing device of the cloud storage system, whether to migrate the data stored at the first location of the bucket to a second location of the bucket in view of the monitoring of the reads of the data by the application;

in response to determining that the data stored at the first location is to be migrated, adding a function trigger to the data, wherein the function trigger causes a particular piece of the data to be migrated from the first location of the bucket to the second location of the bucket upon a subsequent read of the data by the application;

receiving a read request for the particular piece of the data from the application;

transmitting the particular piece of the data to the application from the first location; and migrating the particular piece of the data from the first location to the second location.

2. The method of claim 1, further comprising:

receiving, from a client device, at least one of a read threshold associated with the reads of the data stored at the first location or a cost threshold associated with a cost of migrating the data from the first location of the cloud storage system to the second location of the cloud storage system.

3. The method of claim 2, wherein determining whether to migrate the data stored at the first location of the cloud storage system to the second location of the cloud storage system comprises:

determining whether a number of the reads of the data by the application satisfies the read threshold.

4. The method of claim 2, determining whether to migrate the data stored at the first location of the cloud storage system to the second location of the cloud storage system comprises:

determining whether a migration cost associated with the migration of the data from the first location of the cloud storage system to the second location of the cloud storage system satisfies the cost threshold.

5. The method of claim 4, wherein determining whether the cost associated with the migration of the data from the first location of the cloud storage system to the second location of the cloud storage system satisfies the cost threshold further comprises:

receiving costs for migrating an amount of data from the first location of the cloud storage system to the second location of the cloud storage system; and determining the cost associated with the migration of the data from the first location to the second location in view of the received costs.

6. The method of claim 1, further comprising:

identifying the second location of the cloud storage system in view of reducing an access cost associated with reading the data by the application.

7. The method of claim 1, further comprising:

identifying the second location of the cloud storage system to improve performance of the application.

8. A system, comprising:

a memory; and a processing device of a cloud storage system, operatively coupled to the memory, the processing device to:

add a read function trigger to data stored at a first location of a bucket of a cloud storage system;

receive, from an application, a read request for the data stored at the first location;

in response to receiving the read request, invoke a read function trigger to cause a particular piece of the data to be migrated from the first location of the bucket to a second location of the bucket;

transmit the particular piece of the data to the application from the first location; and migrate the data from the first location of the cloud storage system to the second location of the cloud storage system.

9. The system of claim 8, wherein the processing device is further to:

receive, from a client device, a cost threshold associated with a cost of migrating the data from the first location of the cloud storage system to the second location of the cloud storage system.

10. The system of claim 9, wherein the processing device is further to:

determine whether a migration cost associated with the migration of the data from the first location of the cloud storage system to the second location of the cloud storage system satisfies the cost threshold.

11. The system of claim 10, wherein to determine whether the cost associated with the migration of the data from the first location of the cloud storage system to the second location of the cloud storage system satisfies the cost threshold, the processing device is further to:

receive costs for migrating an amount of data from the first location of the cloud storage system to the second location of the cloud storage system; and determine the cost associated with the migration of the data from the first location to the second location in view of the received costs.

12. The system of claim 8, wherein the processing device is further to:

identify the second location of the cloud storage system in view of reducing an access cost associated with reading the data by the application.

13. The system of claim 8, wherein the processing device is further to:

identify the second location of the cloud storage system to improve performance of the application.

14. The system of claim 8, wherein the processing device is further to:

receive, from the application, a command to migrate the data from the first location of the cloud storage system to the second location of the cloud storage system.

15. A non-transitory computer-readable storage medium including instructions that, when executed by a processing device of a cloud storage system, cause the processing device to:

monitor reads of data stored at a first location of a bucket of a cloud storage system that is accessed by an application;

determine, by the processing device, whether to migrate the data stored at the first location of the bucket to a second location of the bucket in view of the monitoring of the reads of the data by the application;

in response to determining that the data stored at the first location is to be migrated, add a function trigger to the data, wherein the function trigger causes a particular piece of the data to be migrated from the first location of the bucket to the second location of the bucket cloud storage system upon a subsequent read of the data by the application;

receive a read request for the particular piece of the data from the application;

transmit the particular piece of the data to the application from the first location; and migrate the particular piece of the data from the first location to the second location.

16. The non-transitory computer-readable storage medium of claim 15, wherein the processing device is further to:

receive, from a client device, at least one of a read threshold associated with the reads of the data stored at the first location or a cost threshold associated with a cost of migrating the data from the first location of the cloud storage system to the second location of the cloud storage system.

17. The non-transitory computer-readable storage medium of claim 16, wherein to determine whether to migrate the data stored at the first location of the cloud storage system to the second location of the cloud storage system, the processing device is further to:

determine whether a number of the reads of the data by the application satisfies the read threshold.

18. The non-transitory computer-readable storage medium of claim 16, wherein to determine whether to migrate the data stored at the first location of the cloud storage system to the second location of the cloud storage system, the processing device is further to:

determine whether a migration cost associated with the migration of the data from the first location of the cloud storage system to the second location of the cloud storage system satisfies the cost threshold.

19. The non-transitory computer-readable storage medium of claim 18, wherein to determine whether the cost associated with the migration of the data from the first location of the cloud storage system to the second location of the cloud storage system satisfies the cost threshold, the processing device is further to:

receive costs for migrating an amount of data from the first location of the cloud storage system to the second location of the cloud storage system; and determine the cost associated with the migration of the data from the first location to the second location in view of the received costs.

20. The non-transitory computer-readable storage medium of claim 15, wherein the processing device is further to:

identify the second location of the cloud storage system in view of reducing an access cost associated with reading the data by the application.

* * * * *